(12) United States Patent
Kelly et al.

(10) Patent No.: US 11,410,611 B2
(45) Date of Patent: Aug. 9, 2022

(54) AMBIENT LIGHT SENSOR SYSTEM

(71) Applicant: ams AG, Premstaetten (AT)

(72) Inventors: George Richard Kelly, Eindhoven (NL); Pradeep Hegde, Eindhoven (NL)

(73) Assignee: AMS AG, Premstaetten (AT)

( * ) Notice: Subject to any disclaimer, the term of this patent is extended or adjusted under 35 U.S.C. 154(b) by 0 days.

(21) Appl. No.: 17/267,466

(22) PCT Filed: Aug. 9, 2019

(86) PCT No.: PCT/EP2019/071432
§ 371 (c)(1),
(2) Date: Feb. 9, 2021

(87) PCT Pub. No.: WO2020/030786
PCT Pub. Date: Feb. 13, 2020

(65) Prior Publication Data
US 2021/0327364 A1    Oct. 21, 2021

Related U.S. Application Data

(60) Provisional application No. 62/717,205, filed on Aug. 10, 2018, provisional application No. 62/799,261, filed on Jan. 31, 2019.

(51) Int. Cl.
*G09G 3/3266* (2016.01)
*H04M 1/02* (2006.01)

(52) U.S. Cl.
CPC ........ *G09G 3/3266* (2013.01); *H04M 1/0266* (2013.01); *G09G 2300/0819* (2013.01); *G09G 2310/06* (2013.01); *G09G 2320/0233* (2013.01); *G09G 2320/064* (2013.01);
(Continued)

(58) Field of Classification Search
CPC ......... G09G 3/3233; G09G 2300/0842; G09G 2300/0861; G09G 2360/144; G09G 2360/145; G09G 3/20; G09G 3/3266; G09G 2300/0819; G09G 2310/0262; G09G 2310/06; G09G 2320/0233; G09G 2320/0626; G09G 2320/064; H04M 1/0266; H04M 1/72454; H04M 2201/38; H04M 2250/12
See application file for complete search history.

(56) References Cited

U.S. PATENT DOCUMENTS

| | | | |
|---|---|---|---|
| 9,622,326 B1 | 4/2017 | Devyver et al. | |
| 2007/0103397 A1* | 5/2007 | Correa | G09G 3/2944 345/63 |
| 2008/0284716 A1 | 11/2008 | Edwards et al. | |

OTHER PUBLICATIONS

Written Opinion of the International Searching Authority for Application No. PCT/EP2019/071432 dated Oct. 11, 2019.

* cited by examiner

*Primary Examiner* — Nelson M Rosario
(74) *Attorney, Agent, or Firm* — Tarolli, Sundheim, Covell & Tummino LLP

(57) ABSTRACT

An apparatus includes a display screen, an ambient light sensor disposed behind the display screen, and an electronic control unit operable to control a brightness of the display screen based on a duty cycle of a PWM signal. The electronic control unit is operable to sample an output of the ambient light sensor, identify a pair of consecutive samples of the ambient light sensor output that represent a greatest difference in magnitudes of their values, and to estimate a brightness of the display screen based on the difference.

11 Claims, 3 Drawing Sheets

(52) U.S. Cl.
CPC . *G09G 2360/144* (2013.01); *G09G 2360/145* (2013.01); *H04M 2201/38* (2013.01); *H04M 2250/12* (2013.01)

AMBIENT LIGHT SENSOR SYSTEM

RELATED APPLICATIONS

The present invention is a U.S. National Stage under 35 USC 371 patent application, claiming priority to Serial No. PCT/EP2019/071432, filed on 9 Aug. 2019; which claims priority of U.S. Provisional Application No. 62/717205, filed on 10 Aug. 2018 and U.S. Provisional Application No. 62/799261, filed on 31 Jan. 2019, the entirety of all are incorporated herein by reference.

FIELD OF THE DISCLOSURE

This disclosure relates to ambient light sensing systems.

BACKGROUND

A recent trend in smartphone industrial design is to maximize the screen area by reducing the bezel width and decluttering the remaining bezel area by removing apertures for optical sensors and other holes for microphones, speakers and/or fingerprint reading devices. On the other hand, there also is a trend to increase the number of optical sensors for added functionality. For example, ambient light sensors (ALSs) can be provided to facilitate adjustment of the display screen brightness to the surrounding lighting environment so as to make the display appear sharp and readable while also reducing the display's overall energy consumption.

A further trend in the smartphone market is the adoption of organic light emitting displays (OLEDs). This trend creates an opportunity to move the ALS from the smartphone's bezel to a position under the OLED. OLEDs are generally opaque primarily as a result of a protective film on their backside. This film can be removed in a very small area to allow ambient light to pass through the remaining layers of the OLED to reach the ALS. However, even with the film removed, the OLED is not very optically transmissive, thus requiring a very sensitive sensor to make ambient light detection possible. There is a further complication which makes ambient light detection through an OLED technically challenging. An ALS sensor will detect not only ambient light (e.g., background light, sunlight, etc.) passing through the display, but will also detect the light generated by the display itself. As a result, the display brightness, as driven by the ALS, will fluctuate with changes in the brightness of the pixels directly above the sensor. Such fluctuations are undesirable.

SUMMARY

This disclosure describes portable computing devices and other apparatus that include an ambient light sensor system. The techniques described in this disclosure can be particularly advantageous for situations in which the ambient light sensor is disposed behind a display screen of a host device such that ambient light detected by the sensor passes through the light emitting display before being detected by the sensor.

For example, in one aspect, the disclosure describes an apparatus that includes a display screen, an ambient light sensor disposed behind the display screen, and an electronic control unit operable to control a brightness of the display screen based on a duty cycle of a PWM signal. The electronic control unit is operable to sample an output of the ambient light sensor, identify a pair of consecutive samples of the ambient light sensor output that represent a greatest difference in magnitudes of their values, and to estimate a brightness of the display screen based on the difference.

Some implementations include one or more of the following features. For example, in some instances, the electronic control unit is operable to subtract the estimated brightness of the display screen from a signal output by the ambient light sensor so as to obtain an ambient light value, where the signal output by the ambient light sensor represents a combined amount of light including ambient light and light generated by the display screen. The electronic control unit is operable to control the brightness of the display screen based, at least in part, on the ambient light value.

In some instances, the electronic control unit is operable to sample the output of the ambient light sensor at a sampling rate in a range of 1-5 kHz. In some cases, the duty cycle of the PWM signal is less than 20%.

In some implementations, the electronic control unit is operable to convert the difference in the magnitudes of the identified pair of consecutive samples to a corresponding display screen brightness. For example, in some cases, the electronic control unit is operable to access a look-up table to obtain a display screen brightness that corresponds to the difference in the magnitudes of the identified pair of consecutive samples.

The present disclosure also describes a method that includes sampling an output of an ambient light sensor disposed behind a display screen having a brightness controllable by a duty cycle of a PWM signal, identifying a pair of consecutive samples of the ambient light sensor output that represent a greatest difference in magnitudes of their values, and estimating a brightness of the display screen based on the difference.

Other aspects, features and advantages will be readily apparent from the following detailed description, the accompanying drawings and the claims.

DETAILED DESCRIPTION

Figure 1:
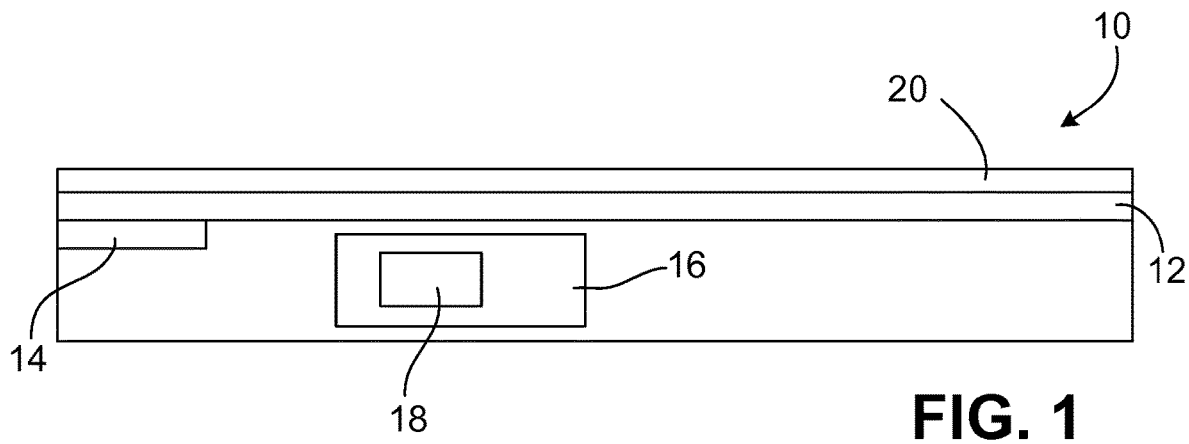
FIG. 1 illustrates various features of a host device that includes an ambient light sensor behind a display screen.

As shown in FIG. 1, a host device 10 such as a portable computing device (e.g., a smartphone, personal digital assistant (PDA), laptop or wearable) includes an OLED-type or other display screen 12, which can be disposed directly under a front glass 20. An ambient light sensor (ALS) 14 is disposed directly under a portion of the display screen 12 and is operable to sense ambient light (e.g., sunlight or other background light). The ALS 14 also may sense light generated by the display screen 12 itself. The ALS 14 can comprise one or more photodiodes or other light sensing elements, each of which is sensitive to a respective wavelength, or range of wavelengths, that may differ from one another. An electronic control unit (ECU) 16 is operable to receive, process and analyze signals from the ALS 14 and to control brightness of the display screen 12. The ECU 16 can be, for example, a processor for the sensor hub or some other processor in the portable computing device 10.

Figure 2:
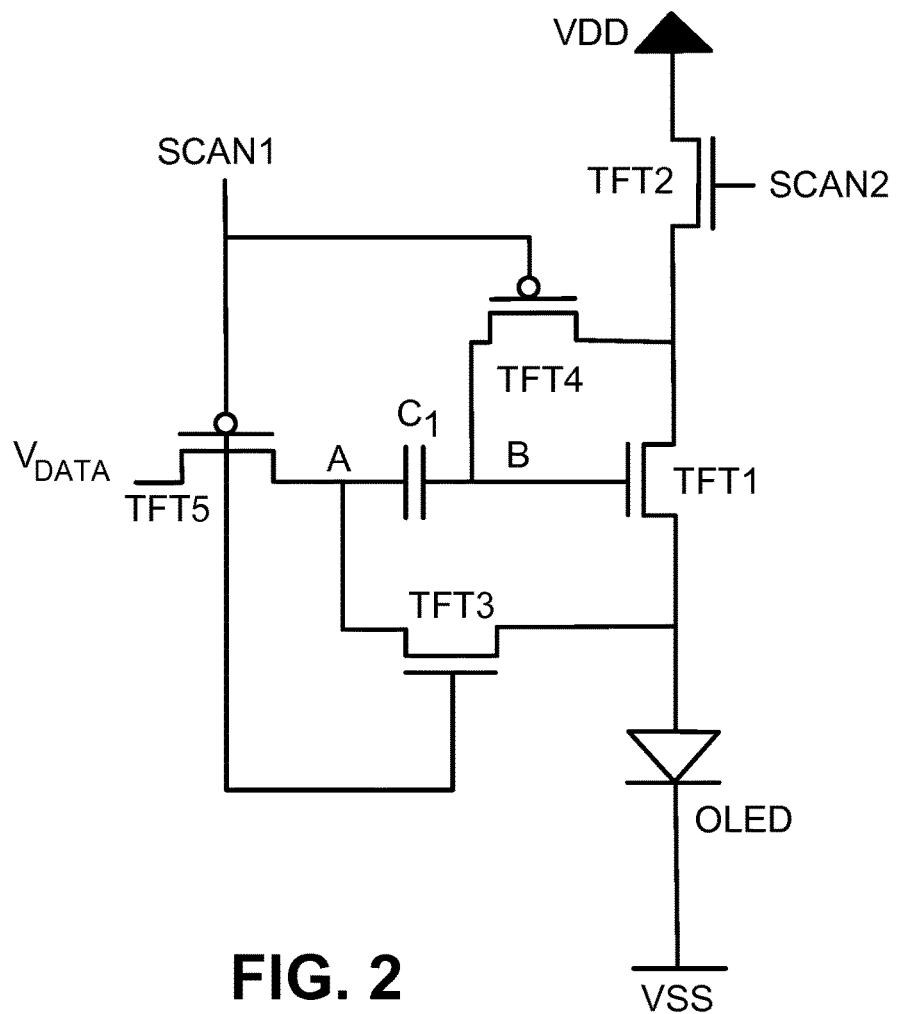
FIG. 2 shows an example of a drive circuit for an organic light emitting display.

Overall brightness of the OLED can be controlled, for example, either by applying PWM modulation of each pixel with a transistor in series with the pixel or by the adjusting the overall range of current that can drive each pixel. FIG. 2 shows an example of an OLED drive circuit for a single OLED pixel. The current that drives each pixel, and therefore the brightness of each pixel, is controlled by a first transistor TFT1 depending on the charge stored on the capacitor C1. Before each pixel is turned on, the capacitor C1 is charged to the appropriate level, VDATA, by setting the voltage SCAN1 to low. Once the voltage SCAN2 becomes high, a second transistor TFT2 turns on and allows current to flow through the OLED pixel as modulated by the first transistor TFT1. The voltage SCAN2 also is used to apply the PWM modulation to reduce the overall display brightness by applying a square waveform at a multiple of the periodic display frame rate (e.g., a multiple of 60 Hz). The duty cycle of the square wave sets the display brightness.

The inventors of the present application determined that the first derivative of the output of the ALS 14 can provide an estimate of the display screen brightness. In particular, the difference between consecutive high and low magnitude values in the signal output by the ALS 14 is approximately proportional to the brightness of the display screen 12 regardless of the presence of ambient light. The difference thus can be used to estimate the display screen brightness. This can be understood by reference to FIGS. 3A-3C, discussed below.

Figure 3A:
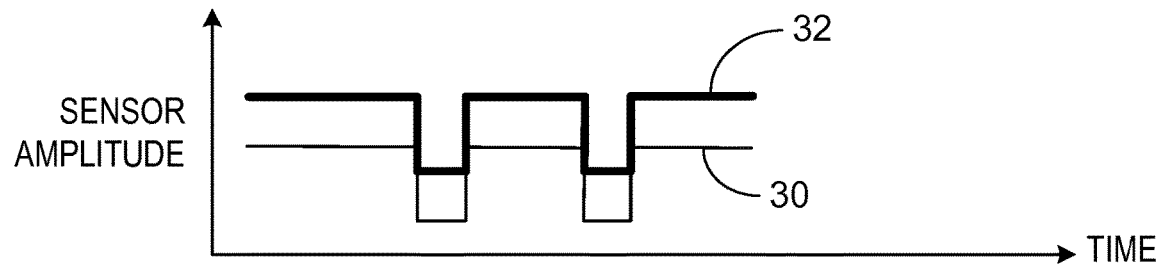
FIGS. 3A, 3B and 3C are illustrating examples of sensor output signals.
Figure 3B:
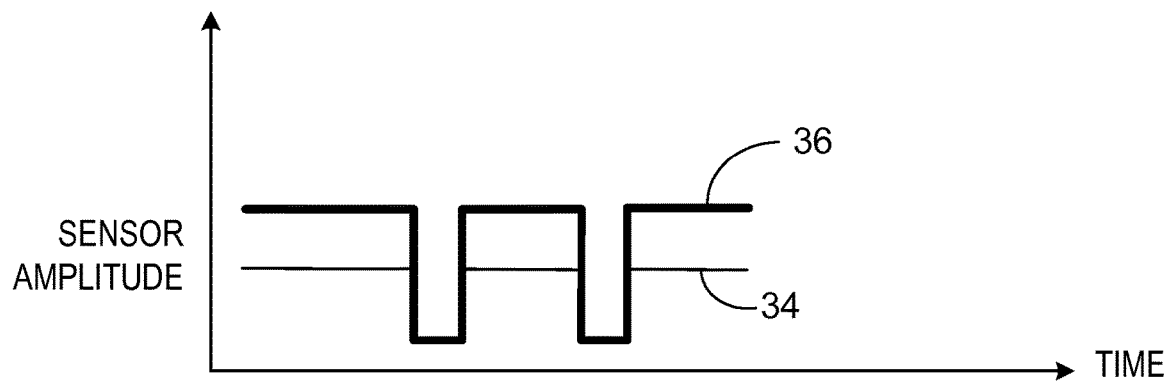
Figure 3C:
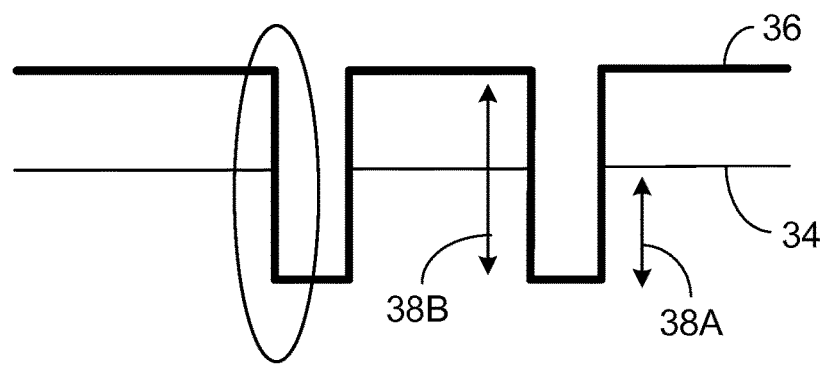

As shown in FIG. 3A, when no ambient light is present, the ALS 14 measures only the light from the display screen 12, which is controlled by a PWM pulse. The ALS output amplitude signal in this case is indicated by 30. On the other hand, when there is ambient light present, the ALS 14 measures a linear sum of the ambient light and light from the display screen 12. The ALS output amplitude signal in this case is indicated by 32. As indicated by FIG. 3B, the height of the pulse in the ALS output signal depends on the brightness of the display screen 12. For example, if the brightness of the display screen 12, based on the applied PWM pulse, is relatively low, then the height of the pulse of the ALS output signal (i.e., the different in amplitude between the high and low values) will be relatively small. In this case, the ALS output amplitude signal is indicated by 34. On the other hand, if the brightness of the display screen 12, based on the applied PWM pulse, is relatively high, then the height of the pulse of the ALS output signal will be relatively large. In this case, the ALS output amplitude signal is indicated by 36. Thus, as indicated by FIG. 3C, assuming the amplitude of the ambient light remains about the same during the relevant measurement period, the height of the pulse (i.e., the difference between consecutive high and low magnitude values) 38A or 38B in the signal output by the ALS 14 is approximately proportional to the brightness of the display screen 12 regardless of the presence of ambient light. Measuring the height of the pulse in the signal output by the ALS 14 allows the system to isolate the amplitude of the display screen light.

Figure 4:
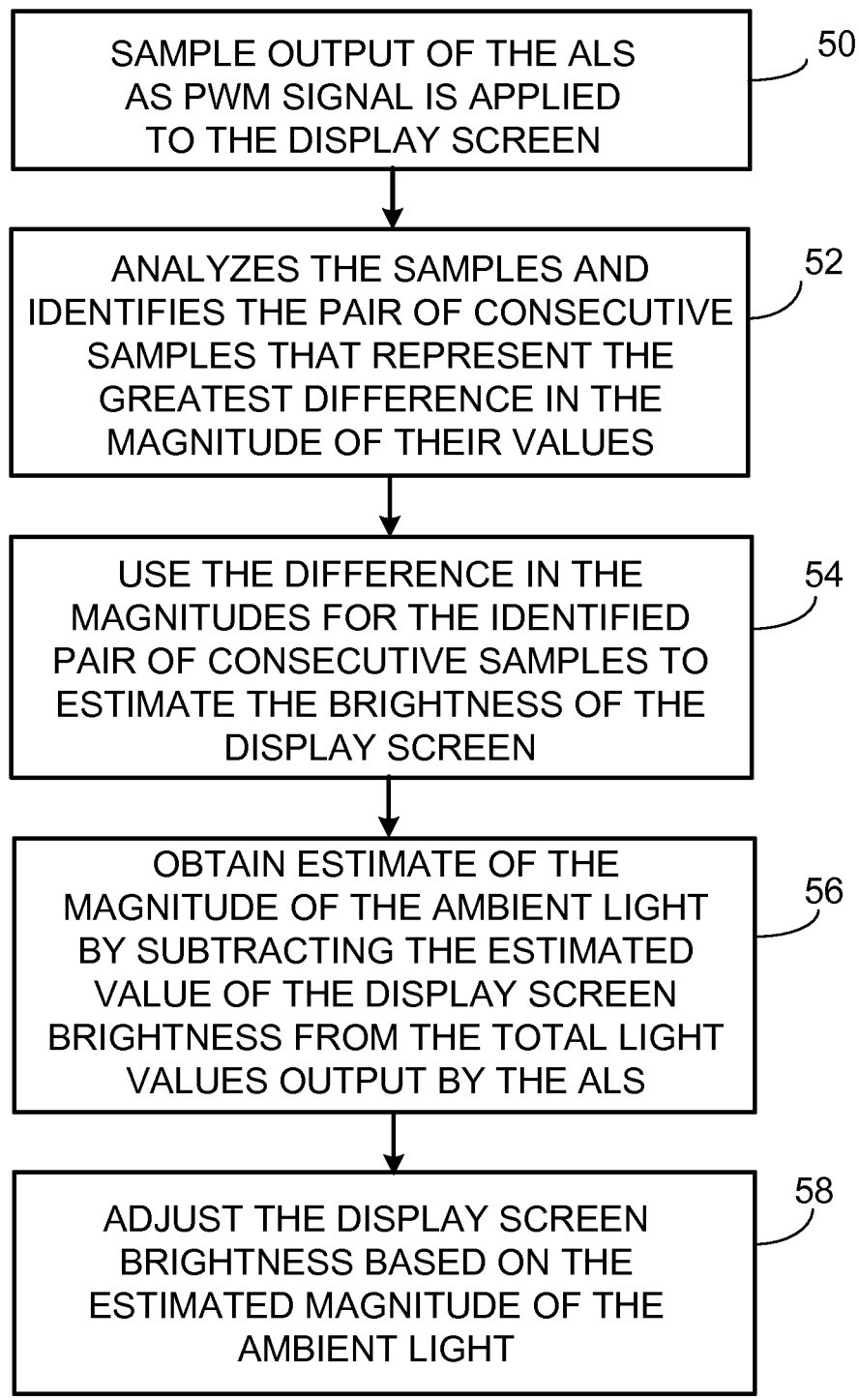
FIG. 4 is a flow chart showing an example of a technique for determining display screen brightness.

FIG. 4 illustrates an example of a process using the foregoing technique. As indicated by 50, as a PWM signal is applied to the display screen 12, the ECU 16 samples the output of the ALS 14. The sampling rate should be sufficiently high, and a statistically significant number of samples should be accumulated, to make it likely that at least one sample is acquired by the ECU 16 while the PWM signal is low (i.e., during a blank off period when the display screen is off) and at least one sample while the PWM signal is high (i.e., during a blanking on period when the display screen is on). For example, in some instances, the sampling rate is in the range of 1-5 kHz (e.g., 2 kHz), and at least 64 samples (e.g., 128 samples) are acquired.

Next, as indicated by 52, the ECU 16 analyzes the samples and identifies the pair of consecutive samples that represent the greatest difference in the magnitude of their values. The identified pair of samples is assumed to represent a transition in the PWM pulse (i.e., from a high value that causes the display screen to be on to a low value that cause the display screen to be off, or vice-versa). In some cases, the ECU 16 may identify more than one pair of consecutive samples that have relatively large differences in the magnitude of the values of the samples. In such cases, the ECU 16 can calculate an average of the difference values.

As indicated by 54, the ECU 16 uses the difference in the magnitudes for the identified pair of consecutive samples to estimate the brightness of the display screen 12. This can be accomplished, for example, by accessing a look-up table 18 stored in memory or by using an algorithm to convert the difference to a corresponding brightness. In either case, experimental data can be obtained in advance to generate the data for the look-up table or to generate an algorithm (e.g., an equation) for converting the difference in the magnitudes for the identified pair of consecutive samples to a display screen brightness.

Next, as indicated by 56, the ECU 16 can subtract the estimated value of the display screen brightness from the total light values output by the ALS 14. This calculated difference provides an estimate of the magnitude of the ambient light, which the ECU 16 can use to adjust the display screen brightness so as to make the display appear sharp and readable while also reducing the display's overall energy consumption (see 58 in FIG. 4). Thus, the display screen brightness can be adjusted more accurately in some cases based on the surrounding lighting environment.

The techniques described here can be particularly advantageous, for example, when the duty cycle drops below about 20%. In such instances, sampling the duty cycle off time can be difficult because the blanking off time is small. If the integration time for capturing the sample is reduced significantly, then the measured sample alone may be less reliable. On the other hand, the present techniques can avoid such issues by using a fast sampling time, which results in a lower integration time. Although the individual samples may be noisy, the difference between the samples still can be used more reliably to estimate the contribution of screen brightness to the total measured brightness of the ALS 14.

Various aspects of the subject matter and the functional operations described in this specification can be implemented in digital electronic circuitry, or in computer software, firmware, or hardware, including the structures disclosed in this specification and their structural equivalents, or in combinations of one or more of them. Thus, aspects of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The apparatus can include, in addition to hardware, code that creates an execution environment for the computer program in question, e.g., code that constitutes processor firmware.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

A number of implementations have been described. Nevertheless, various modifications may be made without departing from the spirit and scope of the invention.

Accordingly, other implementations are within the scope of the claims.

What is claimed is:

1. An apparatus comprising:
    a display screen;
    an ambient light sensor disposed behind the display screen;
    an electronic control unit operable to control a brightness of the display screen based on a duty cycle of a PWM signal,
    wherein the electronic control unit is operable to sample an output of the ambient light sensor, identify a pair of consecutive samples of the ambient light sensor output that represent a greatest difference in magnitudes of their values, and to estimate a brightness of the display screen based on the difference;
    wherein the electronic control unit is operable to sample the output of the ambient light sensor at a sampling rate in a range of 1-5 kHz.

2. The apparatus of claim 1 wherein the electronic control unit is operable to subtract the estimated brightness of the display screen from a signal output by the ambient light sensor so as to obtain an ambient light value, wherein the signal output by the ambient light sensor represents a combined amount of light including ambient light and light generated by the display screen, and wherein the electronic control unit is operable to control the brightness of the display screen based, at least in part, on the ambient light value.

3. The apparatus of claim 1 wherein the electronic control unit is operable to access a look-up table to obtain a display screen brightness that corresponds to the difference in the magnitudes of the identified pair of consecutive samples.

4. The apparatus of claim 1 wherein the electronic control unit is operable to convert the difference in the magnitudes of the identified pair of consecutive samples to a corresponding display screen brightness.

5. The apparatus of claim 1 wherein the duty cycle of the PWM signal is less than 20%.

6. A method comprising:
    sampling an output of an ambient light sensor disposed behind a display screen having a brightness controllable by a duty cycle of a PWM signal;
    identifying a pair of consecutive samples of the ambient light sensor output that represent a greatest difference in magnitudes of their values; and
    estimating a brightness of the display screen based on the difference;
    wherein the output of the ambient light sensor is sampled at a rate in a range of 1-5 kHz and/or wherein the duty cycle of the PWM signal is less than 20%.

7. The method of claim 6 including:
    subtracting the estimated brightness of the display screen from a signal output by the ambient light sensor so as to obtain an ambient light value, wherein the signal output by the ambient light sensor represents a combined amount of light including ambient light and light generated by the display screen, and
    controlling the brightness of the display screen based, at least in part, on the ambient light value.

8. The method of claim 6 including accessing a look-up table to obtain a display screen brightness that corresponds to the difference in the magnitudes of the identified pair of consecutive samples.

9. The method of claim 6 including converting the difference in the magnitudes of the identified pair of consecutive samples to a corresponding display screen brightness.

10. The method of claim 6 including:
   calculating an ambient light level based at least in part on the estimated brightness of the display screen; and
   controlling the duty cycle of the PWM signal so as to adjust the brightness of the display screen based on the calculated ambient light level.

11. An apparatus comprising:
   a display screen;
   an ambient light sensor disposed behind the display screen;
   an electronic control unit operable to control a brightness of the display screen based on a duty cycle of a PWM signal,
wherein the electronic control unit is operable to sample an output of the ambient light sensor, identify a pair of consecutive samples of the ambient light sensor output that represent a greatest difference in magnitudes of their values, and to estimate a brightness of the display screen based on the difference;
   wherein the duty cycle of the PWM signal is less than 20%.

* * * * *